United States Patent
Donaldson (10) Patent No.: US 12,233,675 B2
(45) Date of Patent: Feb. 25, 2025

(54) TIRE ASSEMBLY FOR PROVIDING ENHANCED VEHICLE STABILITY

(71) Applicant: TEREX SOUTH DAKOTA, INC., Watertown, SD (US)

(72) Inventor: James A. Donaldson, Mesquite, NV (US)

(73) Assignee: Terex South Dakota, Inc., Watertown, SD (US)

( * ) Notice: Subject to any disclaimer, the term of this patent is extended or adjusted under 35 U.S.C. 154(b) by 0 days.

(21) Appl. No.: 17/869,880

(22) Filed: Jul. 21, 2022

(65) Prior Publication Data

US 2023/0021632 A1 Jan. 26, 2023

Related U.S. Application Data

(60) Provisional application No. 63/224,629, filed on Jul. 22, 2021.

(51) Int. Cl.
*B60C 3/06* (2006.01)
*B60C 9/17* (2006.01)

(52) U.S. Cl.
CPC .......... *B60C 3/06* (2013.01); *B60C 9/17* (2013.01); *B60Y 2200/49* (2013.01)

(58) Field of Classification Search
CPC .. B60C 3/06; B60C 9/17; B60C 5/002; B60C 15/0236; B60C 2015/0696; B60C 5/01; B60C 3/04; B60C 2200/08; B60C 2200/06; B60C 2200/065; B60C 9/30; B60C 7/00
USPC ............... 152/155, 456, 209.8–209.9, 455
See application file for complete search history.

(56) References Cited

U.S. PATENT DOCUMENTS

| | | | | |
|---|---|---|---|---|
| 2,018,597 A | * | 10/1935 | Bourdon | B60B 17/02 295/30.1 |
| 3,946,784 A | * | 3/1976 | Keith | B60C 11/00 152/185 |
| 5,957,494 A | | 9/1999 | Yahiaoui | |
| 6,415,837 B1 | | 7/2002 | Mackle et al. | |
| 8,356,646 B2 | | 1/2013 | Pringiers | |

(Continued)

FOREIGN PATENT DOCUMENTS

| | | | |
|---|---|---|---|
| JP | H08156517 A | * | 6/1996 |
| JP | 2008143305 A | * | 6/2008 |

OTHER PUBLICATIONS

Jerew, Benjamin, "Know your car parts: What is a car chassis and what does it do", Mar. 9, 2017, https://knowhow.napaonline.com/know-your-car-parts-what-is-a-car-chassis-and-what-does-it-do/ (Year: 2017).*

(Continued)

*Primary Examiner* — Cedrick S Williams
*Assistant Examiner* — Thomas Frank Schneider
(74) *Attorney, Agent, or Firm* — Brooks Kushman P.C.

(57) ABSTRACT

A tire assembly according to the disclosure may include a wheel having a first outer circumferential surface and a second outer circumferential surface, and a tire mounted on the wheel and having a first portion that mates with the first outer circumferential surface of the wheel, and a second portion that is spaced away from the second outer circumferential surface of the wheel to form a cavity. Furthermore, the first portion may be a solid portion that extends from the first outer circumferential surface of the wheel to an outer circumferential surface of the tire.

30 Claims, 7 Drawing Sheets

(56) References Cited

U.S. PATENT DOCUMENTS

| | | | |
|---|---|---|---|
| 9,186,934 B2 | 11/2015 | Korus | |
| 9,643,454 B2* | 5/2017 | Kumar | B29D 30/02 |
| 9,731,562 B2 | 8/2017 | Smith et al. | |
| 2001/0042580 A1* | 11/2001 | Teratani | B60C 17/065 |
| | | | 152/450 |
| 2004/0154718 A1 | 8/2004 | Doesburg | |
| 2014/0083585 A1* | 3/2014 | Korus | B60C 7/24 |
| | | | 152/246 |

OTHER PUBLICATIONS

"Galaxy Audio Galaxy Seeder R-3 "Stubble Proof" Farm Tire 31/13.50R15", Amazon.com, First available Dec. 21, 2018. https://www.amazon.com/Galaxy-Seeder-Stubble-Tire-31-13-50R15/dp/B07MNB794W (Year: 2018).*

PCT International Search Report and Written Opinion of the International Searching Authority Dated Oct. 17, 2022, Application No. PCT/US22/37805, Applicant Terex South Dakota, Inc., 7 Pages.

PCT International Preliminary Report on Patentability dated Feb. 1, 2024, Application No. PCT/US2022/037805, Applicant: Terex South Dakota, Inc. (7 pages).

* cited by examiner

TIRE ASSEMBLY FOR PROVIDING ENHANCED VEHICLE STABILITY

CROSS-REFERENCE TO RELATED APPLICATIONS

This application claims the benefit of U.S. provisional application Ser. No. 63/224,629 filed Jul. 22, 2021, the disclosure of which is hereby incorporated in its entirety by reference herein.

TECHNICAL FIELD

The present disclosure relates to a tire assembly for use with a vehicle, and a vehicle having such a tire assembly.

BACKGROUND

Prior tire assemblies for use with a vehicle are disclosed in U.S. Pat. Nos. 5,957,494 and 8,356,646.

SUMMARY

A tire assembly according to the disclosure may include a wheel having a first outer circumferential surface and a second outer circumferential surface, and a tire mounted on the wheel and having a first portion that mates with the first outer circumferential surface of the wheel, and a second portion that is spaced away from the second outer circumferential surface of the wheel to form a cavity. Furthermore, the first portion may be a solid portion that extends from the first outer circumferential surface of the wheel to an outer circumferential surface of the tire.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
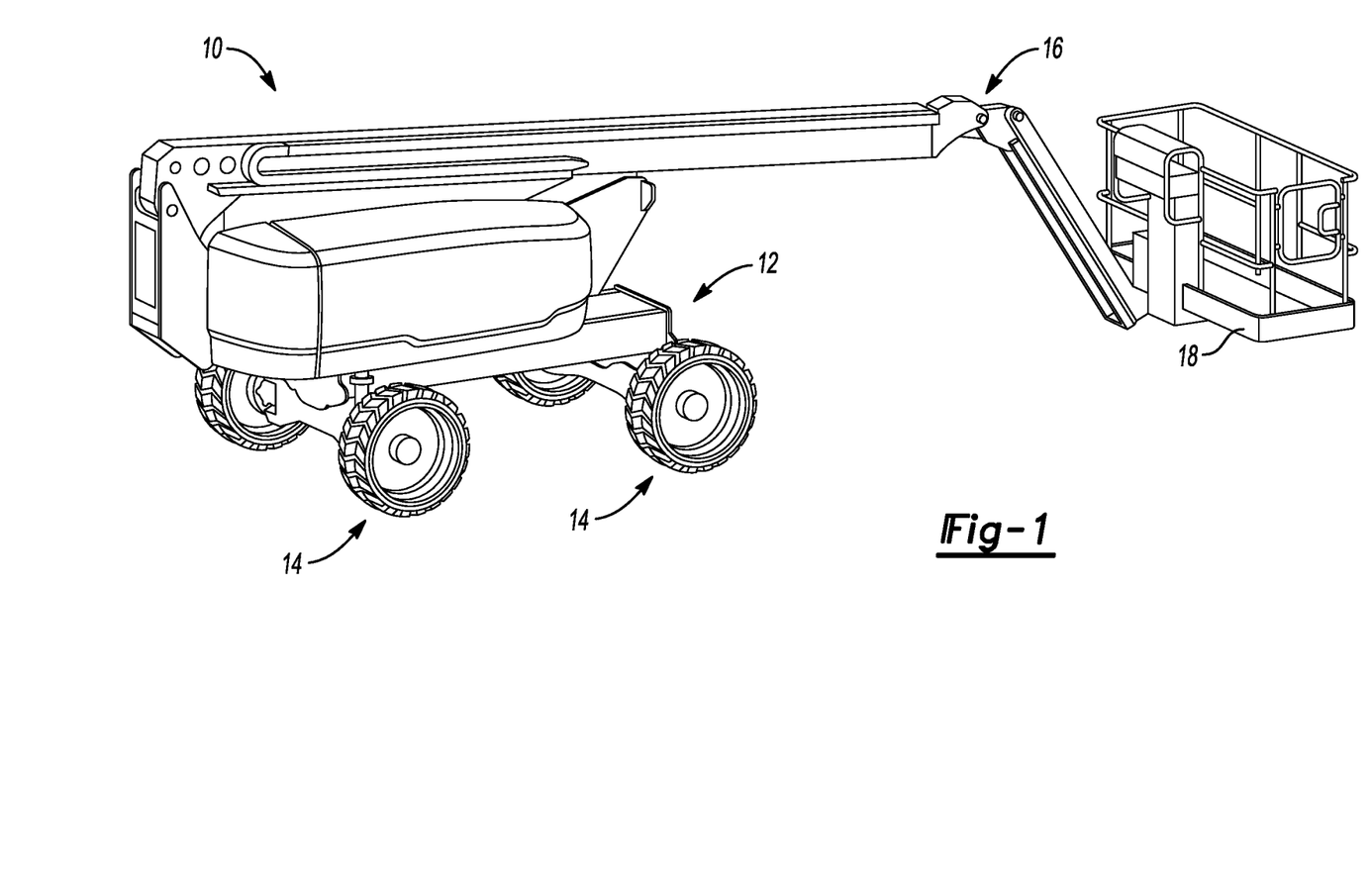
FIG. 1 is a perspective view of a vehicle including multiple tire assemblies according to the disclosure.

FIG. 1 shows a vehicle 10 having a chassis 12 and multiple tire assemblies 14 according to the disclosure attached to the chassis 12. In the illustrated embodiment, the vehicle 10 is a boom lift vehicle having a movable boom assembly 16 and a load carrying member 18, such as an aerial work platform, bucket, fork lift, etc., disposed at an end of the boom assembly 16. It should be noted, however, that one or more tire assemblies 14 according to the disclosure may be used with any suitable stationary or mobile vehicle, such as an automobile, back hoe, excavator, or any machine having a load carrying member such as an aerial work platform.

Figure 2A:
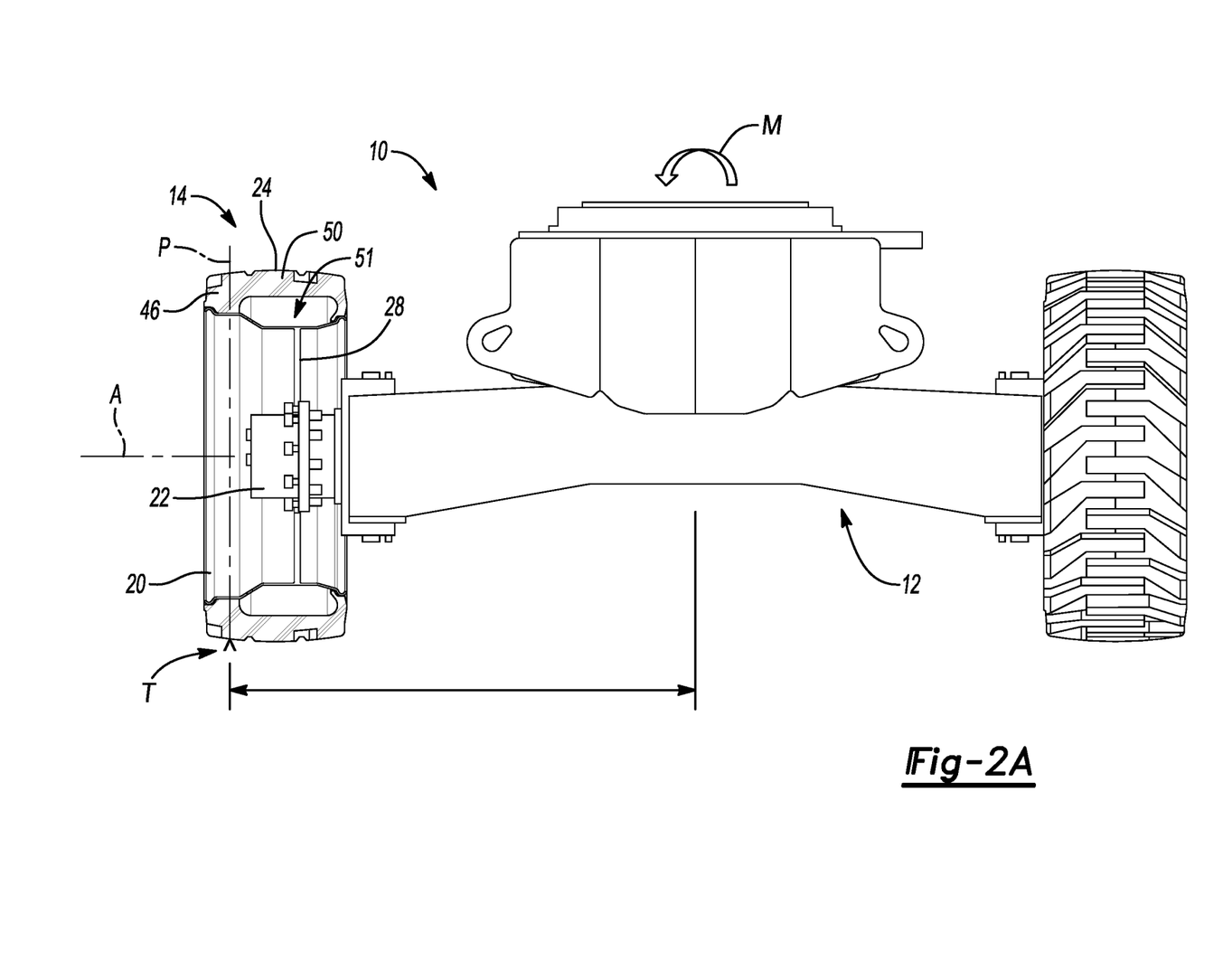
FIG. 2A is an end in view of the vehicle of FIG. 1 showing one of the tire assemblies in cross-section mounted on an axle of the vehicle.
Figure 2B:
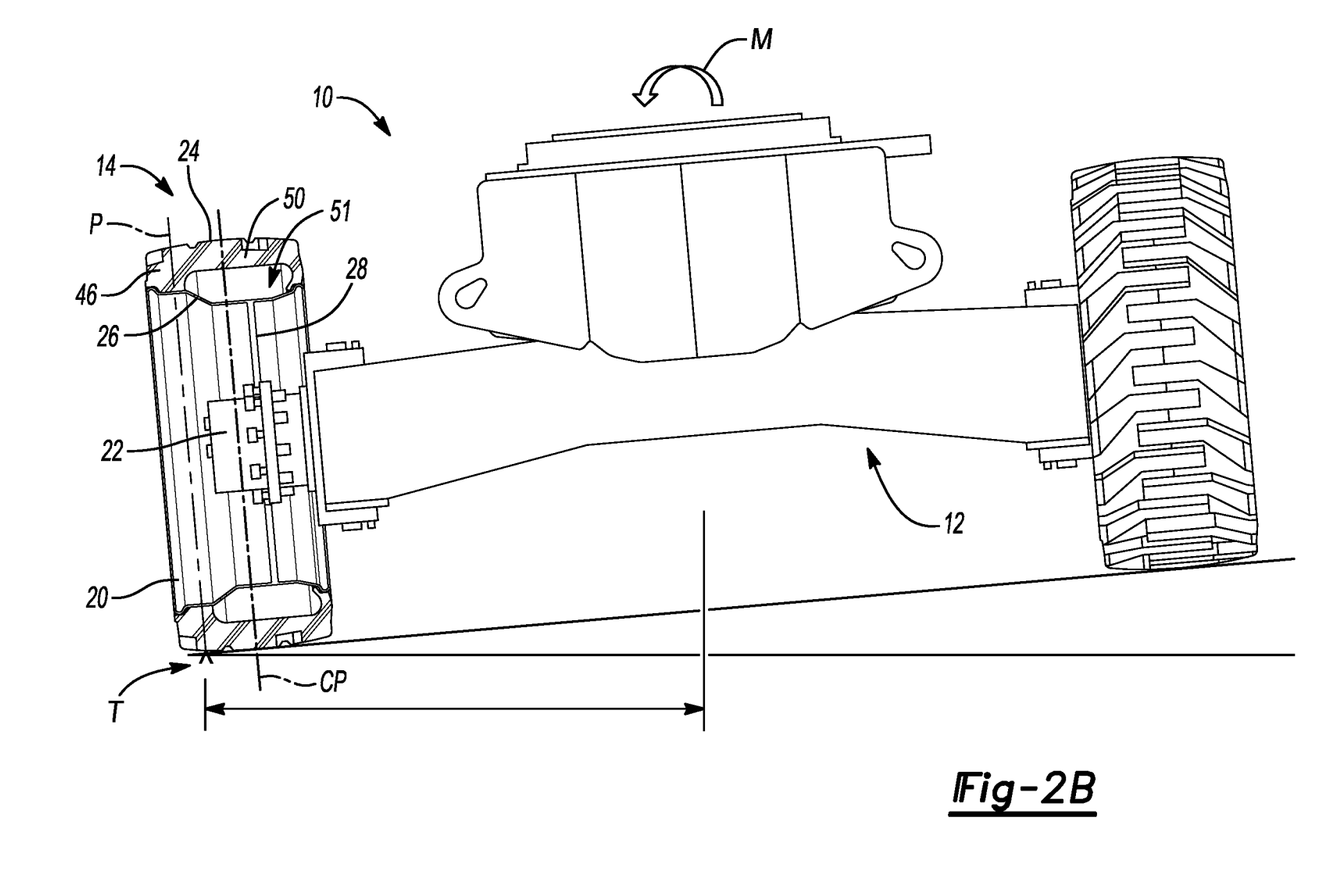
FIG. 2B is an end view of the vehicle of FIG. 1 showing the vehicle on a ground surface that is inclined in a direction generally perpendicular to a direction of travel.
Figure 3:
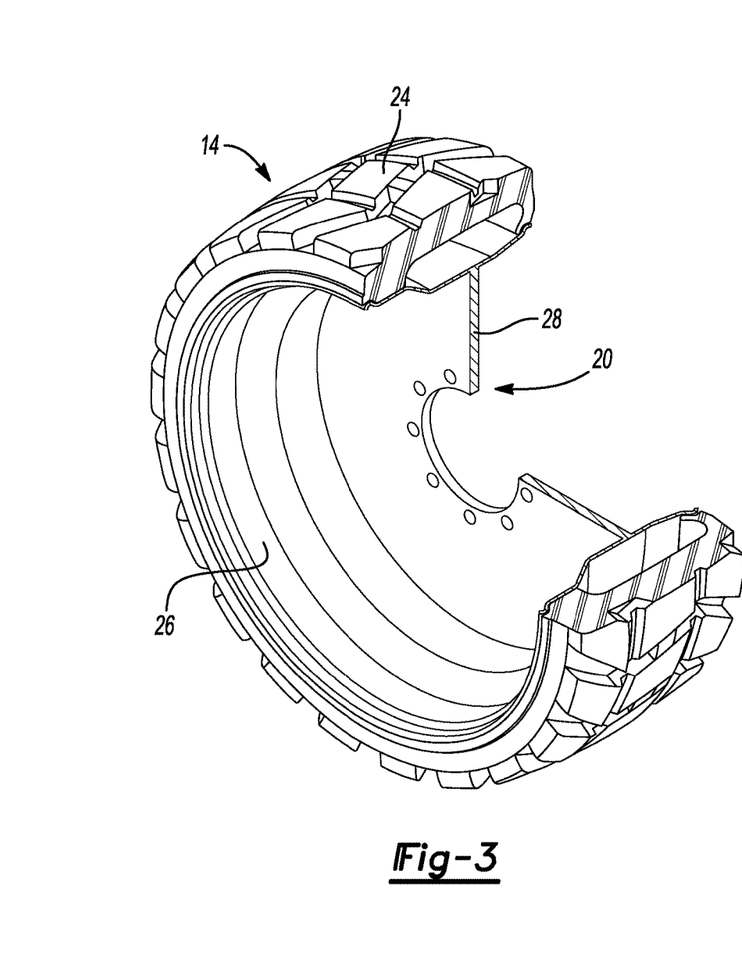
FIG. 3 is a perspective sectional view of the tire assembly shown in FIG. 2A, wherein the tire assembly includes a wheel and a tire mounted on the wheel.

Referring to the embodiment shown in FIGS. 1-2B, changes associated with a surface (e.g., grade changes, ground compaction, etc.) on which the vehicle 10 travels and/or changes associated with the vehicle 10 (e.g., movement of the boom assembly 16 and/or loading of the load carrying member 18) may cause movement or shifting of a center of mass of the vehicle 10 during use. For example, referring to FIGS. 1 and 2A, as the boom assembly 16 is extended (e.g., to a left side of the vehicle 10 shown in FIG. 2A) and/or a load is applied to the load carrying member 18, the center of mass of the vehicle 10 may move outwardly toward the supporting tire assemblies 14 (e.g., the leftmost tire assembly 14 shown in FIG. 2A). As another example, referring to FIG. 2B, if the grade of the ground surface on which the vehicle 10 is traveling changes, the center of mass of the vehicle 10 may likewise move outwardly toward the supporting tire assemblies 14 (e.g., the leftmost tire assembly 14 shown in FIG. 2B). If the center of mass moves beyond a tip line T, the vehicle 10 may tip over. Advantageously, the tire assemblies 14 may provide a tip line T that is moved outwardly (e.g., further from a central plane of the chassis 12) compared to prior tire assemblies, as will be explained below in more detail, thereby providing improved lateral stability of the vehicle 10.

Referring to FIGS. 2A-6, one of the tire assemblies 14 mounted on the left side of the vehicle 10 will now be explained in more detail, with the understanding that the other tire assemblies 14 of the vehicle 10 may have the same or similar construction. The tire assemblies 14 on the right side of the vehicle 10, however, may each be rotated 180° about a vertical axis so that the tire assemblies 14 on the right side of the vehicle 10 each have an opposite configuration and cross-section compared to the tire assembly 14 on the left side of the vehicle 10. As shown in FIG. 2A, the tire assembly 14 includes a wheel 20 mounted on a hub 22 of an axle or axle shaft, which is rotatably supported by the chassis 12 so that the wheel 20 is rotatable about an axis A, and a tire 24 mounted on the wheel 20 so that the tire 24 is rotatable with the wheel 20.

In the embodiment shown in FIGS. 2A-5, the wheel 20 has an outer annular portion 26 and an inner member 28, such as a plate shaped member, for mounting the wheel 20 onto the hub 22. The outer portion 26 has a first circumferential lip or bead 30 that has a first diameter 32, and a second circumferential lip or bead 34 that has a second diameter 36. The outer portion 26 further has a first outer circumferential surface 38 and a second outer circumferential surface 40. The first outer circumferential surface 38, or at least an annular portion thereof, has a first outer diameter 42, and the second outer circumferential surface 40, or at least an annular portion thereof, has a second outer diameter 44. In the embodiment shown in the Figures, the first outer diameter 42 of the first outer circumferential surface 38 is larger than the second diameter 36 of the second circumferential bead 34 and the second outer diameter 44 of the second outer circumferential surface 40, but smaller than the first diameter 32 of the first circumferential bead 30. Furthermore, in the illustrated embodiment, the first diameter 32 of the first circumferential bead 30 is larger than the second diameter 36 of the second circumferential bead 34. In another embodiment, the circumferential surfaces 38 and 40 may have the same diameter, or the first circumferential surface 38 may have a diameter that is smaller than a diameter of the second circumferential surface 40. When the first outer diameter 42 of the first outer circumferential surface 38 and the second outer diameter 44 of the second outer circumferential surface 40 are different, and/or when the first diameter 32 of the first circumferential bead 30 and the second diameter 36 of the second circumferential bead 34 are different, the wheel 20 may have an asymmetric cross-section (e.g., axial cross-section).

Figure 4:
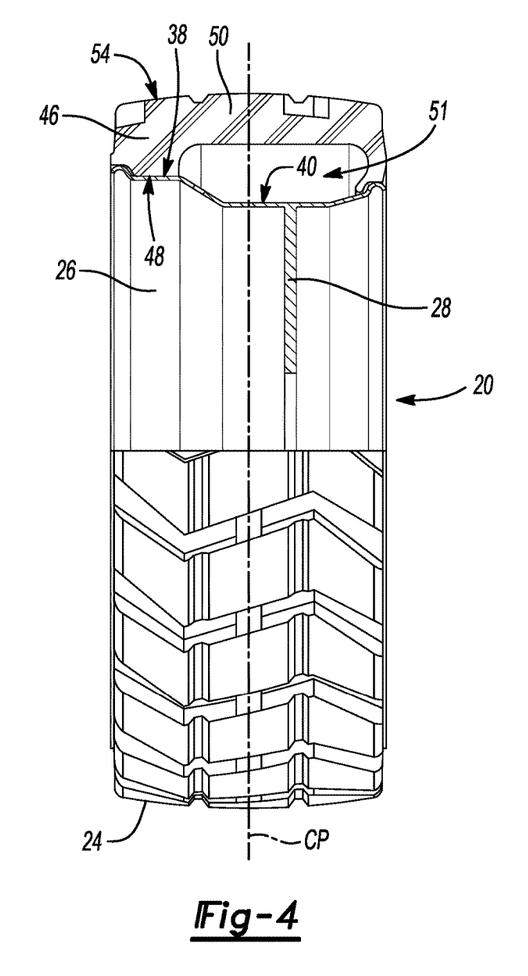
FIG. 4 is an end view of the tire assembly shown in FIG. 2A.
Figure 6:
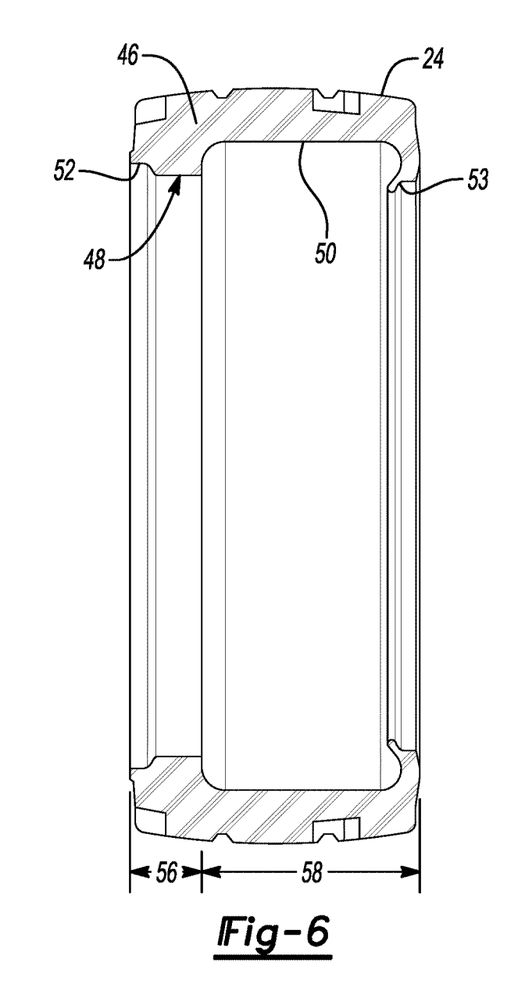
FIG. 6 is a cross-sectional view of the tire.

Referring to FIGS. 4 and 6, the tire 24 has a first circumferential portion 46 having an inner circumferential surface 48 that mates with (i.e., contacts) the first outer circumferential surface 38 of the wheel 20, and a second circumferential portion 50 laterally adjacent the first circumferential portion 46 and formed integrally with the first circumferential portion 46. Furthermore, the second circumferential portion 50 is spaced away from the second outer circumferential surface 40 of the wheel 20 to form or define a cavity 51 therebetween. With such a configuration, the tire 24 may have an asymmetric cross-section (e.g., axial cross-section) as shown in FIGS. 4 and 6. For example, the cavity 51 may be asymmetric in an axial direction with respect to a central plane CP of the tire 24, as shown in FIG. 4. In addition, the first portion 46 may have a first circumferential bead or channel 52 configured to mate with, or otherwise cooperate with, the first circumferential bead 30 of the wheel 20, and the second portion 50 may likewise have a second circumferential bead or channel 53 configured to mate with the second circumferential bead 34 of the wheel 20.

The first portion 46 is a solid portion that extends radially outward from the first outer circumferential surface 38 of the wheel 20 to an outer circumferential surface 54 of the tire 24, which outer circumferential surface 54 is defined by the first and second portions 46 and 50, respectively. Furthermore, the first portion 46 may have any suitable width sufficient to cooperate with the first outer circumferential surface 38 of the wheel 20 (e.g., width of the first portion 46 may generally correspond to width of the first outer circumferential surface 38) to vary the tip line T across a width of the tire assembly 14 as desired. For example, the first portion 46 may have a width 56 in an axial direction of at least 2.54 cm (1.0 inches), or at least 3.81 cm (1.5 inches), or at least 5.08 cm (2.0 inches), or at least 6.35 cm (2.5 inches). As other examples, the width 56 may be at least 10%, or at least 15%, or at least 20%, or at least 25% of an overall width of the tire 24, which may be in the range of 20.32 to 60.96 cm (8 to 24 inches), for example. In the illustrated embodiment, the second portion 50 is wider than the first portion 46. For example, the second portion 50 may have a width 58 in the axial direction that is at least twice the width 56, or at least 2.5 times the width 56, or at least 3 times the width 56 of the first portion 46.

The tire 24 may be made of any suitable material, such as rubber (natural and/or synthetic) and reinforcing materials, and may be formed in any suitable manner. Furthermore, the cavity 51 formed between the tire 24 and the wheel 20 may be filled (e.g., partially or fully) with any suitable filler or combination of fillers. For example, the cavity 51 may be at least partially filled with foam, such as oil-based or water-based foam provided with or without a filler material (e.g., ground tire particles), and/or pressurized air.

Figure 5:
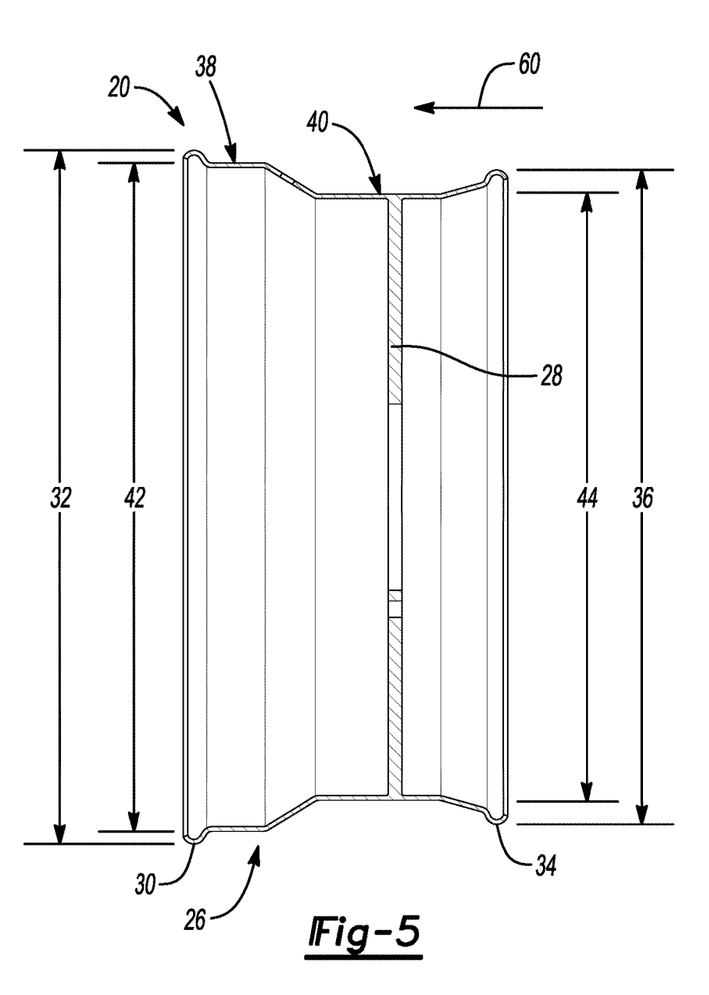
FIG. 5 is a cross-sectional view of the wheel.

The tire 24 may be mounted on the wheel 20 in the direction 60 shown in FIG. 5, so that the first portion 46 of the tire 24 passes over the second circumferential bead 34 and the second outer circumferential surface 40 of the wheel 20 before mating with the first outer circumferential surface 38 of the wheel 20. Furthermore, the tire assembly 14 may be mounted on the vehicle 10 so that the first portion 46 of the tire 24 and the first outer circumferential surface 38 of the wheel 20 are positioned on an outboard side of the vehicle 10.

Figure 7A:
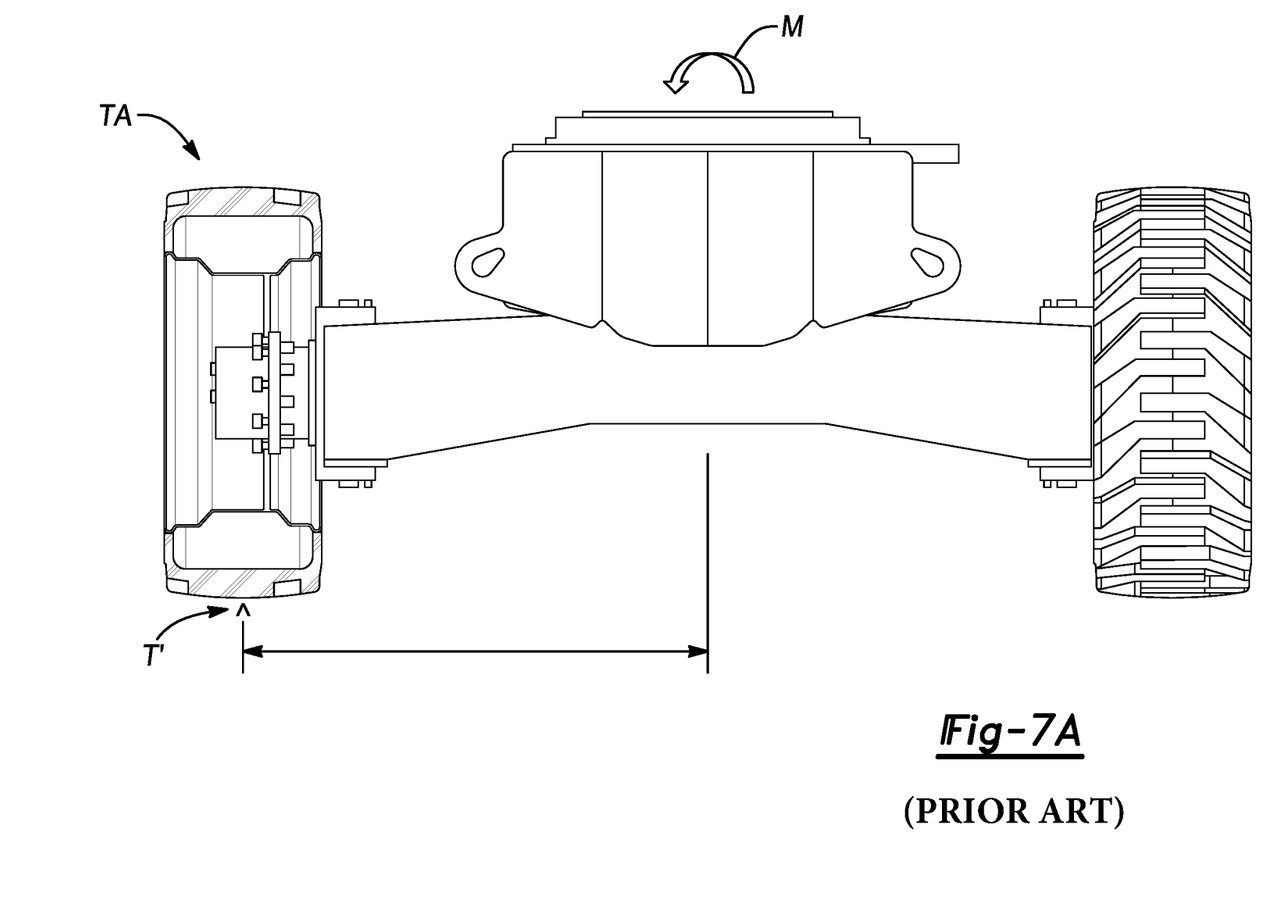
FIG. 7A is an end view of a vehicle showing a prior tire assembly.
Figure 7B:
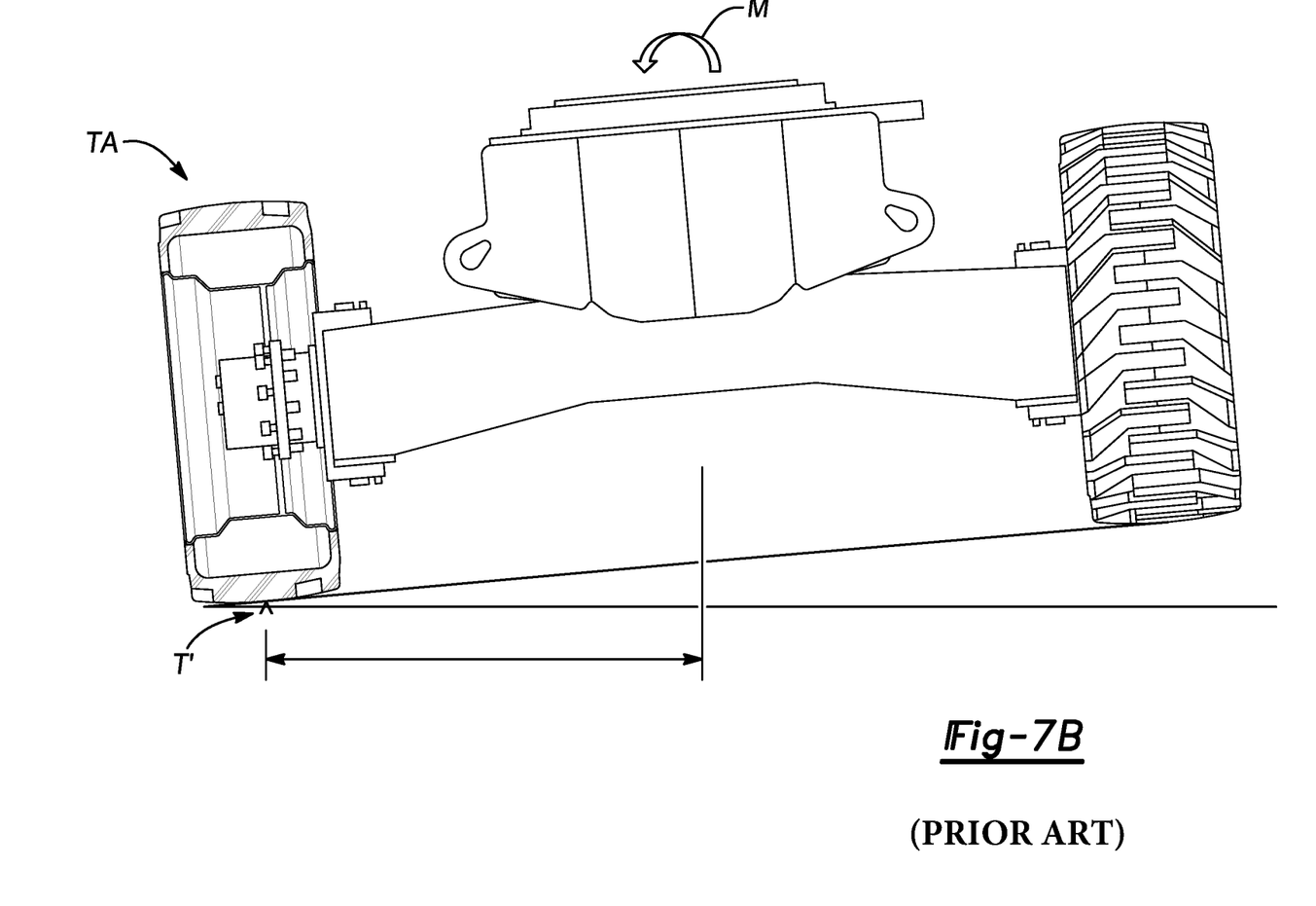
FIG. 7B is an end view of the vehicle of FIG. 7A showing the vehicle on a ground surface that is inclined in a direction generally perpendicular to a direction of travel.

With the above configuration and orientation, the tire assembly 14 may provide a comfortable ride for the vehicle 10 while also providing improved lateral stability for the vehicle 10. In that regard, because the tire assembly 14 includes the cavity 51, the tire assembly 14 may provide a more comfortable ride as compared to a solid tire. Furthermore, due to changes in vehicle operation and/or ground surface changes (e.g., grade changes), the tip line T provided by the tire assembly 14 may be laterally outward of a tip line provided by a prior tire assembly, so that lateral stability of the vehicle 10 may be improved. Referring to FIGS. 2A and 2B, the tip line T of the tire assembly 14 may be aligned with a plane P that extends through the first portion 46 of the tire 24 of the tire assembly 14, which first portion 46, as mentioned above, is a solid portion. For example, the tip line T may be generally aligned with a central plane of the first portion 46, wherein the central plane may be parallel to sides of the wheel 20. Therefore, the tip line T may be positioned outboard of the central plane CP of the tire 24 and tire assembly 14. FIGS. 7A and 7B, on the other hand, show a prior tire assembly TA that defines a tip line T' that is generally aligned with a central plane of the overall tire assembly, which is inboard of the tip line T (e.g., closer to a central plane of a chassis of the associated vehicle). Therefore, when an equal overturning moment M is applied to the vehicle 10 shown in FIG. 2A and the vehicle shown in FIG. 7A (e.g., to an upper portion of the associated chassis or a component, such as a turntable, attached to the chassis), or when the vehicles are traveling on an inclined surface (see FIGS. 2B and 7B), the tire assembly 14 will provide improved lateral stability as compared to the prior tire assembly TA.

Furthermore, with the above configuration of the tire assembly 14, an inner diameter of the wheel 20 may be made larger than an inner diameter of the prior tire assembly TA, while still maintaining a similar overall height of the tire assembly 14 compared to the prior tire assembly TA. As a result, the tire assembly 14 may allow positioning of a steering/pivot axis (e.g., kingpin) closer to a center of the wheel 20 (if the tire assembly 14 is mounted on a steerable or pivotable hub), thereby further improving lateral stability.

Various changes may be made to the illustrated embodiment to form other embodiments according to the disclosure. For example, the first outer circumferential surface 38 of the wheel 20 may be angled toward a central portion of the wheel 20, and the inner circumferential surface 48 of the tire 24 may likewise be angled toward a central portion of the tire 24 (e.g., the circumferential surfaces 38 and 48 may each have a frustoconical shape). In other words, an outboard end or side of the first outer circumferential surface 38 (i.e., the end or side of the first outer circumferential surface 38 that is closest to the first circumferential bead 30) may define a larger diameter than an inboard end or side of the first outer circumferential surface 38, and an outboard end or side of the inner circumferential surface 48 may define a larger diameter than an inboard end or side of the inner circumferential surface 48. With such a configuration, the tire assembly 14 may provide enhanced resistance to outboard lateral movement of the tire 24 with respect to the wheel 20.

In yet another embodiment, the first outer circumferential surface 38 of the wheel 20 may be sloped or angled so that an outboard end or side of the first outer circumferential surface 38 defines a smaller diameter than an inboard end or side of the first outer circumferential surface 38. Likewise, the inner circumferential surface 48 of the tire 24 may be sloped or angled so that an outboard end or side of the inner circumferential surface 48 defines a smaller diameter than an inboard end or side of the inner circumferential surface 48.

Furthermore, with asymmetric tire and wheel configurations (e.g., cross-sections) according to the disclosure, tire assemblies may be designed to provide tip lines at any suitable locations. For example, a tire assembly may be designed to provide a tip line that is located outboard of the tip line T shown in FIGS. 2A and 2B.

Aspects of embodiments according to the disclosure are provided in the below numbered clauses.

1. A tire assembly for use with a vehicle may comprise a wheel having a first outer circumferential surface and a second outer circumferential surface; and a tire mounted on the wheel and having a first portion that mates with the first outer circumferential surface of the wheel, and a second portion that is spaced away from the second outer circumferential surface of the wheel to form a cavity, wherein the first portion is a solid portion that extends from the first outer circumferential surface of the wheel to an outer circumferential surface of the tire.

2. The tire assembly of clause 1, wherein the first portion of the tire is configured to define a tip line that is positioned outboard of a central plane of the tire.

3. The tire assembly of clause 1, wherein the first portion has a width of at least 2.54 cm (1.0 inches).

4. The tire assembly of clause 3, wherein the width of the first portion is at least 3.81 cm (1.5 inches).

5. The tire assembly of clause 3, wherein the width of the first portion is at least 5.08 cm (2.0 inches).

6. The tire assembly of clause 3, wherein the width of the first portion is at least 6.35 cm (2.5 inches).

7. The tire assembly of clause 1 wherein the first outer circumferential surface of the wheel comprises an annular portion having a first outer diameter, and the second outer circumferential surface of the wheel comprises an annular portion having a second outer diameter that is less than the first outer diameter.

8. The tire assembly of our clause 7 wherein, when the tire assembly is mounted on the vehicle, the first portion of the tire is positioned on an outboard side of the vehicle.

9. The tire assembly of clause 8 wherein the wheel has an inboard bead configured to be positioned on an inboard side of the vehicle when the tire assembly is mounted on the vehicle, and wherein the inboard bead has an outer diameter that is less than the first outer diameter of the annular portion of the first outer circumferential surface of the wheel.

10. The tire assembly of clause 1 wherein the first outer circumferential surface of the wheel comprises an annular portion positionable on an outboard side of the vehicle and having a first outer diameter, and the wheel has a bead positionable on an inboard side of the vehicle, and wherein the bead has an outer diameter that is less than the first outer diameter.

11. The tire assembly of clause 1 wherein the tire comprises a filler disposed in the cavity.

12. The tire assembly of clause 1 wherein the tire comprises foam disposed in the cavity.

13. The tire assembly of clause 1 wherein the cavity of the tire is fillable with air.

14. The tire assembly of clause 1, wherein the first portion has a width that is at least 10% of an overall width of the tire.

15. The tire assembly of clause 14, wherein the width of the first portion is at least 15% of the overall width of the tire.

16. The tire assembly of clause 14, wherein the width of the first portion is at least 20% of the overall width of the tire.

17. The tire assembly of clause 14, wherein the width of the first portion is at least 25% of the overall width of the tire.

18. A vehicle according to the disclosure may comprise a chassis, and a tire assembly attached to the chassis. The tire assembly may include a wheel having a first outer circumferential surface and a second outer circumferential surface positioned inboard of the first outer circumferential surface; and a tire mounted on the wheel and having a first portion that mates with the first outer circumferential surface of the wheel, and a second portion that is spaced away from the second outer circumferential surface of the wheel to form a cavity. The first portion may be a solid portion that extends from the first outer circumferential surface of the wheel to an outer circumferential surface of the tire. Furthermore, the first portion may define a tip line that is positioned outboard of a central plane of the tire.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A tire assembly for use with a vehicle, the tire assembly comprising:
    a wheel having a first outer circumferential surface and a second outer circumferential surface; and
    a tire mounted on the wheel and having a first portion that mates with the first outer circumferential surface of the wheel, and a second portion that is laterally adjacent to the first portion and spaced away from the second outer circumferential surface of the wheel to define a cavity therebetween, wherein the first portion is a solid portion that extends radially outward from the first outer circumferential surface of the wheel to an outer circumferential surface of the tire that extends from a first outer side of the tire to a second outer side of the tire, the outer circumferential surface of the tire does not extend radially inwardly of a radially outermost portion of the cavity, the tire has an asymmetric axial cross-section such that the cavity is asymmetric in an axial direction with respect to a central plane of the tire, the first portion defines the first outer side of the tire, the first portion extends from the first outer side of the tire to an edge of the cavity closest to the first outer side of the tire so that the first portion does not overlap the cavity in the axial direction when the vehicle is on level ground, the second portion extends in the axial direction from the first portion to the second outer side of the tire, the second portion is wider than the first portion, and the first portion has a width that is at least 20% of an overall width of the tire.

2. The tire assembly of claim 1 wherein the first portion has a width of at least 2.54 cm (1.0 inches).

3. The tire assembly of claim 2 wherein the width of the first portion is at least 3.81 cm (1.5 inches).

4. The tire assembly of claim 2 wherein the width of the first portion is at least 5.08 cm (2.0 inches).

5. The tire assembly of claim 2 wherein the width of the first portion is at least 6.35 cm (2.5 inches).

6. The tire assembly of claim 1 wherein the first outer circumferential surface of the wheel comprises an annular portion having a first outer diameter, and the second outer circumferential surface of the wheel comprises an annular portion having a second outer diameter that is less than the first outer diameter.

7. The tire assembly of claim 6 wherein, when the tire assembly is mounted on the vehicle, the first portion of the tire is positioned on an outboard side of the vehicle.

8. The tire assembly of claim 7 wherein the wheel has an inboard bead configured to be positioned on inboard side of the vehicle when the tire assembly is mounted on the vehicle, and wherein the inboard bead has an outer diameter that is less than the first outer diameter of the annular portion of the first outer circumferential surface of the wheel.

9. The tire assembly of claim 1 wherein the first outer circumferential surface of the wheel comprises an annular portion positionable on an outboard side of the vehicle and having a first outer diameter, and the wheel has a bead positionable on an inboard side of the vehicle, and wherein the bead has an outer diameter that is less than the first outer diameter.

10. The tire assembly of claim 1 wherein the tire comprises a filler disposed in the cavity.

11. The tire assembly of claim 1 wherein the tire comprises foam disposed in the cavity.

12. The tire assembly of claim 1 wherein the cavity of the tire is fillable with air.

13. The tire assembly of claim 1 wherein the width of the first portion is at least 25% of the overall width of the tire.

14. The tire assembly of claim 1 wherein the first portion of the tire has a first inner diameter, and the second portion of the tire has a second inner diameter that is larger than the first inner diameter.

15. A vehicle comprising:
a chassis; and
two of the tire assemblies of claim 1 attached to the chassis so that the tire assemblies are disposed on opposite sides of the chassis, wherein, for each of the tire assemblies, the first portion of the tire is configured to define a tip line so that the tip line is aligned with a plane that is parallel to a side of the wheel and that extends continuously through the first portion from the outer circumferential surface of the tire to the first outer circumferential surface of the wheel, and the plane does not extend through the cavity.

16. The vehicle of claim 15, wherein the vehicle is a boom lift vehicle having a movable boom assembly supported on the chassis and a work platform at an end of the boom assembly.

17. A vehicle comprising:
a chassis; and
a tire assembly attached to the chassis, the tire assembly including:
a wheel having a first outer circumferential surface and a second outer circumferential surface positioned inboard of the first outer circumferential surface; and
a tire mounted on the wheel and having a first portion that mates with the first outer circumferential surface of the wheel, and a second portion that is laterally adjacent to the first portion and spaced away from the second outer circumferential surface of the wheel to define a cavity therebetween, wherein the tire has an asymmetric axial cross-section such that the cavity is asymmetric in an axial direction with respect to a central plane of the tire, the first and second portions collectively define an outer circumferential surface of the tire that extends from a first outer side of the tire to a second outer side of the tire, the outer circumferential surface of the tire does not extend radially inwardly of a radially outermost portion of the cavity, the first portion is a solid portion that extends radially outward from the first outer circumferential surface of the wheel to the outer circumferential surface of the tire, the first portion is configured to define a tip line that is positioned outboard of the central plane of the tire so that the tip line is aligned with a plane that is parallel to a side of the wheel and that extends continuously through the first portion from the outer circumferential surface of the tire to the first outer circumferential surface of the wheel, and the plane does not extend through the cavity, and wherein the first portion defines the first outer side of the tire, the first portion extends from the first outer side to an edge of the cavity closest to the first outer side so that the first portion does not extend over the cavity in the axial direction when the vehicle is on level ground, the second portion extends in the axial direction from the first portion to the second outer side of the tire, the second portion is wider than the first portion, and the first portion has a width that is at least 20% of an overall width of the tire.

18. The vehicle of claim 17 wherein the first portion of the tire has a first inner diameter, and the second portion of the tire has a second inner diameter that is larger than the first inner diameter.

19. The vehicle of claim 17 wherein the width of the first portion of the tire is at least 25% of the overall width of the tire, and the second portion of the tire has a width that is at least twice the width of the first portion.

20. The vehicle of claim 17 wherein the first portion of the tire does not extend under the cavity in the axial direction when the vehicle is on level ground.

21. The vehicle of claim 20 wherein the width of the first portion is at least 25% of the overall width of the tire.

22. The vehicle of claim 17 wherein the outer circumferential surface of the tire has a convex shape from the first outer side of the tire to the second outer side of the tire.

23. The vehicle of claim 17 wherein the outer circumferential surface of the tire has a convex shape from the first outer side of the tire to the second outer side of the tire, excluding any tread pattern.

24. The vehicle of claim 15 wherein the first portion of each tire is positioned on an outboard side of the vehicle.

25. The vehicle of claim 15 wherein, for each of the tire assemblies, the first portion is configured to define the tip line so that the tip line is positioned outboard of the central plane of the tire.

26. The vehicle of claim 15 wherein the width of the first portion is at least 25% of the overall width of the tire.

27. The vehicle of claim 26, wherein the second portion has a width that is at least 2.5 times the width of the first portion.

28. The vehicle of claim 15 wherein the second portion has a width that is at least 3 times the width of the first portion.

29. The tire assembly of claim 1 wherein the outer circumferential surface of the tire has a convex shape from the first outer side of the tire to the second outer side of the tire.

30. The tire assembly of claim 1 wherein the outer circumferential surface of the tire has a convex shape from the first outer side of the tire to the second outer side of the tire, excluding any tread pattern.

* * * * *